US009482779B2

(12) United States Patent
Elson et al.

(10) Patent No.: US 9,482,779 B2
(45) Date of Patent: Nov. 1, 2016

(54) DEVICE AND METHODS FOR DETECTING A CAMERA

(71) Applicant: Optishell Technologies Ltd., Rosh Ha'ayin (IL)

(72) Inventors: Eliahu Elson, Ramat Gan (IL); Yossef Gerard Cohen, Rosh Ha'ayin (IL)

(73) Assignee: OPTISHELL TECHNOLOGIES LTD., Rosh Ha'ayin (IL)

( * ) Notice: Subject to any disclaimer, the term of this patent is extended or adjusted under 35 U.S.C. 154(b) by 232 days.

(21) Appl. No.: 14/097,076

(22) Filed: Dec. 4, 2013

(65) Prior Publication Data

US 2014/0157442 A1 Jun. 5, 2014

Related U.S. Application Data

(60) Provisional application No. 61/733,120, filed on Dec. 4, 2012.

(51) Int. Cl.
*G06F 21/10* (2013.01)
*G01V 8/12* (2006.01)

(52) U.S. Cl.
CPC .............. *G01V 8/12* (2013.01); *G06F 21/10* (2013.01)

(58) Field of Classification Search
None
See application file for complete search history.

(56) References Cited

U.S. PATENT DOCUMENTS

| 2002/0171813 | A1* | 11/2002 | Kimura | H04N 5/74 353/122 |
| 2005/0219112 | A1* | 10/2005 | Balogh | H04N 5/913 342/14 |
| 2012/0128330 | A1* | 5/2012 | Mahdavi | G06K 9/3216 386/252 |
| 2012/0229637 | A1* | 9/2012 | Mooradian | G06K 9/4661 348/143 |
| 2012/0314085 | A1* | 12/2012 | Gohshi | H04N 9/3102 348/164 |

OTHER PUBLICATIONS

The PirateEye Technology, Pirate Eye, Aug. 2011.*
Yamada et al., Enhancement of Method for Preventing Illegal Recording of Movies to Enable It to Detect Cameras with Attached Infrared-Cut Filter, IEEE, Mar. 2012.*

* cited by examiner

*Primary Examiner* — Minh Dinh
(74) *Attorney, Agent, or Firm* — J. Peter Paredes; David G. Rosenbaum; Rosebaum IP, P.C

(57) ABSTRACT

A camera detector device for detecting the presence of an illegal camera inside a room. A camera takes multiple pictures of a room and identifies reflections in each still image. If a reflection with similar properties appears repeatedly overtime than the reflection is identified as an illegal camera positioned towards the camera detector device.

15 Claims, 2 Drawing Sheets

DEVICE AND METHODS FOR DETECTING A CAMERA

CROSS-REFERENCE TO RELATED APPLICATIONS

The present applications claims priority from Provisional Patent Application Ser. No. 61/733,120, filed on Dec. 4, 2012, which is herein incorporated by reference in its entirety.

BACKGROUND

The present invention relates in general to devices and methods for detecting a camera, and in particular for detecting an illegal video camera filming inside a movie theater.

Hollywood studios lose billions of dollars each year in unearned revenues, since pirate organization release bootleg copies of movies by illegally inserting a camera into a movie theater and filming the movie on screen. Sometimes, the movie is pirated during a premier projection and released on the internet on the same day or the very next day. As a result, people can download the movie and watch it for free at home instead of going to the cinema and buying a ticket.

The problem has become even more acute for the studios in recent years due to the following reasons: a) It is not necessary to download anymore an entire film to a computer, a movie can now be streamed to a computer using a high-bandwidth internet connection; b) High definition, large television screens can be connected to a computer, so the user can watch a pirated movie of high quality on a home theater system; and c) It is not necessary anymore to use expensive equipment to pirate movies. Nowadays, many smartphones with a camera such as Apple's iPhone™ or other smartphones have enough memory to record an entire movie with a good resolution of 5-8 megapixel. These reasons offer an appealing incentive to illegally record movies, share them on the Web and watch them comfortably.

The studios have tried to fight this undesired phenomenon in several ways: a) Antipiracy organizations such as the Movie Picture Association of America (MPAA) prepare and file laws against individuals who record, share or even view pirated movies; b) Movie theatre managers hire specialists with special equipment to detect illegal camera usage during screening, these people may even use night goggles to be able to see the audience and what he is doing; and c) Offer a financial compensation for anybody who provides information about pirate activities. All these methods cost a lot of money to the studios and yet every year the numbers of films pirated increases.

Some automatic devices have been developed in order to automatically detect a camera that is filming in a movie theater. These devices are expensive to be installed in movie theaters and are based only on lenses detection using the retro-reflective physical principal and in addition suffer from a relatively high period for scanning all the seats in the movie theater. If a person holds a mobile phone without intension, and the camera's side faces the screen, the existing solutions can falsely detect the person as a pirate. There is thus a need in the industry for a solution that will calculate for how long a camera is facing the screen and thus only point out a pirate usage if the camera is facing the screen for a substantial period of time.

SUMMARY OF THE INVENTION

Provided herein are systems, methods and apparatuses for a camera detector device for detecting the presence of an illegal camera inside a room, the device comprising: a light source for illuminating a room; a light detector for capturing multiple images of said room; a blob database for storing blobs representing reflections identified in said captured images, each blob being identified via one or more properties; and a processor for analyzing said multiple images of the room taken over a period of time in order to identify blobs representing reflections in said images, and signaling a blob as an illegal camera if said blob appears in said multiple images over a predetermined amount of time with similar blob properties within predefined threshold values for each blob property.

A method for detecting the presence of one or more active video cameras positioned towards a screen by capturing electromagnetic radiation emanating from said one or more video cameras is disclosed, the method comprising: illuminating a room with infrared and/or visible light signal; having multi length signal illuminated on the audience and the space in front the screen; having an infrared signal emitted from the audience and any object in the said space; having multi length signal emitted from the audience and any object in the said space; passing said infrared signal through an optical filter; detecting said infrared signal by a detector; and translating the signal received by the detector to a signal representing the estimated number of one or more active video cameras positioned towards to the screen.

An overlay system in a movie theater is disclosed and adapted for receiving a signal from a camera detector that an illegal camera has been detected in the movie theater and overlaying a text warning message on the movie screen of said movie theater.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
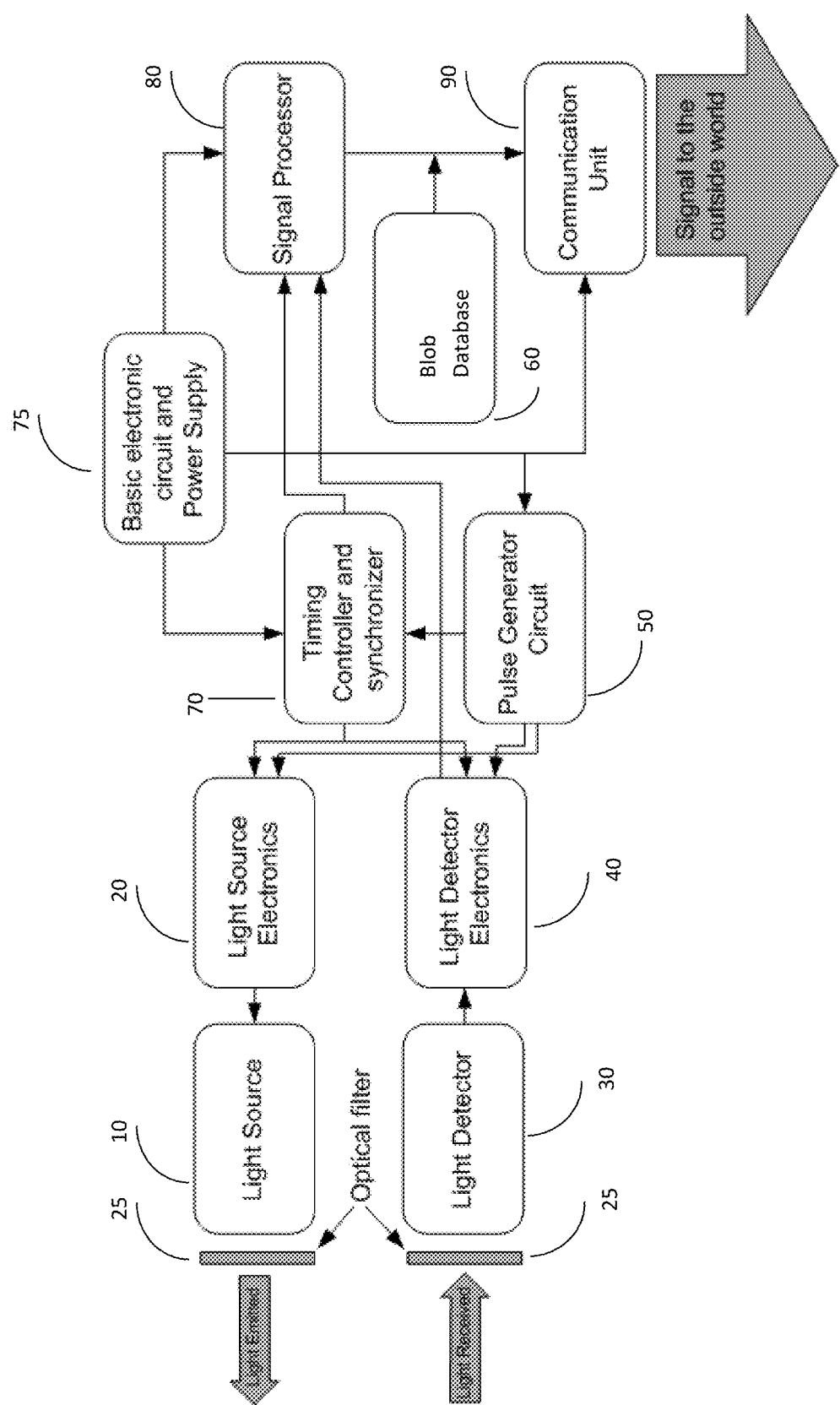
FIG. 1 is a block diagram of light source and light reflected.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

It is an object of the present invention to provide methods and devices for detecting a video camera.

The present invention relates to devices and methods for detecting the presence of a video camera in particular during the screening of a movie inside a movie theater. The invention can also be used in other locations where the usage of a video camera is restricted, for example, law courts, exhibitions, theatres, concerts, sport events etc.

The present invention relates to a camera detector device for detecting the presence of an illegal camera inside a room, the device comprising: a light source for illuminating a room; a light detector for capturing multiple images of said room; a blob database for storing blobs representing reflections identified in said captured images, each blob being identified via one or more properties; and a processor for analyzing said multiple images of the room taken over a period of time in order to identify blobs representing reflections in said images, and signaling a blob as an illegal camera if said blob appears in said multiple images over a predetermined amount of time with similar blob properties within predefined threshold values for each blob property.

The present invention estimates the presence of any kind of camera that is located at any distance in front of the device of the invention. In a movie theater, the device of the invention is best located by the screen facing the viewers (audience), such as to best detect an illegal camera filming the movie being screened. Alternatively, devices of the invention can also be located in several locations inside a room or movie theater, for example, at the back of seat such as to monitor the person sitting behind that seat. The information gathered by the device of the invention about potential illegal cameras in the room can be shared with the defined authorities for the room's security (such as movie theater operator) who can then take measures to apprehend the person with the illegal camera.

The invention works by capturing still images in short intervals of a room (in front a screen in a movie theater) and looking for all blobs representing the reflections from the room in each image. Each blob is represented in a Blob database by one or more properties comprising location, size, shape, intensity or any combination thereof. Algorithms of the invention then compare these blobs and look for changes in the blobs (i.e. changes in the properties of the blobs) in any cycle. The image capture module of the invention scans a large field of view (for example +/−10 degrees) so that during a few steps, for example, 6 steps it can cover all the auditorium and then start the scanning process again. As a result, a large database of blobs can be formed covering a certain period of time, for example, 10, 20, 30 or 40 minutes and stored in a Blob database. The Blob database can then be analyzed for permanent or moving reflections representing an area from the body of a camera such as: housing, tripod, metal parts, lenses, eyes of the pirate (person using the illegal camera), for example, the location of the camera relative to the eyes of the pirate and the pirate profile behavior, movements of the camera such us different poses of the camera in order to be able to film the movie without losing any frame, suspected human behavior since the person trying to illegally film the screen needs to have the camera aimed towards the screen most of the time. If a film lasts for 90 minutes the Blob database will contain a very large number of Blobs and thus the reflections from different zones in the room can be compared over time. Using a small field of view is disadvantageous since the scanning of an auditorium may take a long time (for example, 20-30 minutes) and the opportunity to effectively analyze the images captured will be very low. The term "database" refers to any form of memory or storage for digital photographs, for example, a magnetic hard drive, an optical drive, internal Random Access Memory (RAM), Flash memory, storage at a remote server, storage over the Internet (Cloud) or any combination thereof.

The detector device of the invention can use both visible light and invisible light in order not to annoy the audience. The usage of both wavelengths enables the device to collect reflections from visible light and additional reflections from invisible light and thus enlarge the database. The detector device can use visible light only, invisible light only or both visible and invisible light.

The analysis algorithms then look for blobs representing reflections from the same zone in the audience that remain constant in time, for example, the blob location, shape, intensity, size, diameter (in any combination of properties) which represent the same camera that is facing the screen, since the pirate needs to make an effort to capture the screen all the time. It does not really matter if the camera is at an absolutely fixed location or if the camera changes locations since the algorithm tracks blobs with similar properties around a location, for example, +/−1, 2, 3, 4, 5 meters or any other predetermined distance.

When comparing blobs in different image captures, the properties of each blob are compared. Each property can have a predetermined threshold value defined, such as that if the difference between two blobs for a given property fall within the threshold value for that property, the properties are considered as having the same value. The threshold can be defined either as a percentage or by the property values. For example, for the location property (X, Y and Z coordinates), it can be determined that the threshold value for (X, Y, Z) are (5%, 4%, 6%) or they can be defined in length units, for example, (1 meter, 0.5 meter, 0.5 meter).

Other blobs may appear and then disappear. If, for example, the image capture device detects earrings of a woman in one scanning, typically, the woman will move a bit in place and thus the earrings' reflection will not be detected along all images or one or more of the properties of the blob such as the shape/intensity/dimension will change significantly, for example, 30% or more, thus eliminating the probability that the identified blobs (reflections) come from a camera constantly or with similar blobs pointed at the screen at most of the time.

In some embodiments, the detector device of the invention can send alerts (to the movie theater operator, studios, police, event managers, security personnel etc.) when the device detects a suspected illegal recording (filming) device (camera).

The detector device of the invention comprises an illuminator module comprising infrared light and/or visible light illuminators, an image capture module, a scanning module, a database for storing images, a processing module and an electronics card to drive the illumination module and the scanning motor, in addition, the electronic card captures the images for the image and signal processing. It is also possible to get the same result without a scanning module but with a large field of view camera with many pixels, for example, a 5-10 Mega pixel camera. Then, the panorama is available in one picture (shot) and the blobs are analyzed similarly.

Preferably, in a movie theater, the detector device is located close and under the screen or alternatively above the screen or below and above, such that it can illuminate the audience/room with both the invisible infrared illuminator and the visible wavelength light illuminator. Alternatively, one or more detector devices can be located in different places in the room, each controlling a smaller zone of the room. The visible wavelength light and the invisible light reflected from the room in front of the screen enter the image capture module of the detector device. Then the reflected light signals are detected by the image capture module, the electronics card translates the signals it receives from the image capture module to a signal representing reflections that could represent illegal video cameras in the room.

In some embodiments, the light source uses visible light and the light source is operated in a movie theater when at least one of the following conditions is met: the illuminance of the movie screen is at least 10 lux; the value of the illuminance of the movie screen is at least 10% of the value of the light source; or the audible sound of the movie played is at least 50 decibels.

In some embodiments, the camera detector is placed in a movie theater and said illegal camera is an illegal camera filming a movie played on a screen in said movie theater.

In some embodiments, after an illegal camera is detected a message is spoken and/or overlaid on a screen in said room urging the user of said illegal camera to stop filming with said illegal camera.

In some embodiments, the message comprises information about the location of said illegal camera in the room.

In some embodiments, the message comprises a picture of the area of said illegal camera in the room or a close-up picture of the person using the illegal camera.

In another aspect, the present invention relates to a camera detector device as defined above, wherein the light source uses visible light and the light source is operated in a movie theater when at least one of the following conditions is met: the illuminance of the movie screen is at least 10 lux; the value of the illuminance of the movie screen is at least 10% of the value of the light source; or the audible sound of the movie played is at least 50 decibels.

In yet another aspect, the present invention relates to an overlay system in a movie theater adapted for receiving a signal from a camera detector that an illegal camera has been detected in the movie theater and overlaying a text warning message on the movie screen of said movie theater.

In some embodiments, the message comprises information about the location of said illegal camera in the room.

In some embodiments, the message comprises a picture of the area of said illegal camera in the room or a close-up picture of the person using the illegal camera.

In some embodiments, the text message is accompanied by an audio message.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software. It is further evident to any person skilled in the art that whenever a "software" module is described the implementation of the software is done as part of a computing device with a processor and memory and also that a "software" module may be entirely stored and run in and executed from a hardware device such as an electronic chip.

A "processor" means any one or more microprocessors, central processing units (CPUs), computing devices, microcontrollers, digital signal processors, or like devices.

The term "detector" as referred herein should be understood in a wide sense, for example, a CCD/CMOS/light sensor or VMD algorithms using data collected by a camera. It may also be incorporated together in a single chip the camera detector and the processor running the algorithm.

In some embodiments, the detector device has one axis of rotation with a large field of view that can detect in one frame (image captured) a large portion of a room (i.e. many rows in the movie theater or ⅕ of the auditorium) such that after a few steps/cycles (for example, 3 to 5 steps) it can build a panorama of all the reflections in the room. The term "room" as defined herein refers to the portions of the room that need to be monitored and not necessary always the entire room. The detector device can then start to compare reflections while it scans the room in the opposite way or in the same direction again. All the images captured are analyzed to identify blobs representing reflections in said images (room). The blobs are then stored in a blob database. The shape and dynamic movements of the reflections can tell us if it is a fixed metal or fixed plastic even if the person filming illegally will move it from time to time, by allowing a predetermined movement tolerance to still be considered as a fixed blob. If the reflection comes from a fixed tripod many kinds of Video Motion Detection (VMD) algorithms of the art are applicable. For example, if reflections from glasses are detected, the person with the glasses will most probably be moving in his seat during the film so the location of the reflections and/or the shape of the reflection and/or the intensity of the reflections in earlier cycle(s) will be different enough from the reflections in the consecutive cycles. On the other hand, cameras that are placed to record the film should be quite stable in order to capture the film with a good quality, thus the changes in the reflection from any part of the (fixed) camera will be noticeably lower than the changes in the reflections of the (moving) glasses in terms of the location or shape or intensity of a reflection. If the pirate (person using illegal camera) tries to move the camera from time to time, he will still need to maintain the camera facing the screen at all time and thus the algorithm of the invention will track similar blobs in shape or intensity or size (or any combination thereof) that are facing the screen most of the time, which is not true for eyes and watches and earrings or glasses of the audience. The algorithm of the invention builds a blob database of the reflections and after analysis, identifies the reflections (not only permanent reflections) that have the lowest changes over a predefined number of cycles, for example, 7 cycles of capturing the entire room (or 3, 4, 5, 6, 8, 9 10, 15, 20, 25, 30, 35 or 40 cycles). Since the intensity of the reflections depends on the distance of the device from the camera, a detection threshold is defined for each blob property (location, size, shape, intensity etc.) as a function of the distance of the device (producing the reflection) from the camera. The algorithm can also use alternate lighting of the audience with visible light and without visible light and then subtract the images. The algorithm of the invention tracks all the blobs (reflections) in the panorama (of the room/movie theater) that are created. If a reflection appears at the same area for a predefined amount of time (with a tolerance for movements by the pirate's movements during the recording) than the reflection is suspected as a piracy candidate representing an illegal camera. If the reflection (blobs) appears but not all the time, than it is assumed to be related to the audience that is inside the cinema, for example, an accessory worn by a person. Statistical algorithms can also be used, for example, different averages, moving averages, random distribution, shape blob analysis, facial detection algorithms for eliminating all faces reflections such as earrings/glasses/eyes or for detection of miniature cameras installed on glasses. Using these algorithms, the number of reflections (blobs) and information received after several minutes (for example, 10 minutes) is tremendous and can be sufficient to draw strong candidates for piracy (video camera usage). The invention compares the full panorama reflections picture to previous panorama pictures, in several wavelengths.

In order to find the blobs of the reflections the invention uses any combination of one or more image processing routines such as: image thresholds, morphologic spatial algorithms, stabilization of image due to movement of the camera that may occur also due to speakers sound, image averaging to reduce noise, dividing the image to several areas according to the distance from screen and the threshold is applied gradually according to these areas. The resulting image after running the above one or more algorithms serves then as input for the Blob analysis. The processor then builds a blob database of candidate blobs for statistical tracking of blob appearances (including properties such as location, intensity, size, shape and uniformity). The processor then builds a panorama representing the whole auditorium, and then the blob location is determined in the panorama coordinates.

Before people enter the room, several images are captured and analyzed in order to identify the permanent reflections and blobs from the room. If the target room is a movie theater, the room may be put in the same conditions as when a movie is played, for example, by dimming the lights or actually running the movie. These permanent reflections and blobs are then stored in a blob database and will be ignored when analyzing the room with people. Any identified blob in the panorama of the audience is compared with the permanent blobs in the blob database. Blobs that are identified as permanent blobs (appear in the room before people entered to it) are thus ignored and not considered as representing an illegal camera. The permanent blobs can be any metal objects in the room, any reflective surfaces in the room, light sources in the room etc.

It is not necessary to store in the Blob database the actual pictures taken of the room, but only the identified blobs need to be stored. If a current blob, is not a permanent blob, and has appeared at the same location in the past predetermined time period, than this blob is identified as a potential illegal camera filming. Several actual images of the audience may be taken and stored in memory, in particular pictures of the area near an identified illegal camera such that it helps identify the person operating the illegal camera.

Existing solutions such as pirate-eye technology aim to detect the retro reflections from the lens of a camcorder. The invention looks for all the reflections from the room in front of the detection device and compares them at several seconds' intervals by using sophisticated algorithms for analyzing the changes between the reflections in any time cycle. The image capture module of the invention captures a large field of view (for example, 10 degrees) so that during a few steps, for example, 5 steps it can cover all the auditorium, for a total of up to +/−90 degrees (room or area in the room to be monitored) and then start the scanning process again. As a result, a large database of blobs (identified reflections) can be formed covering a certain period of time, for example, 20 minutes (or 10, 30 or 40 minutes). The Blob database can then be analyzed for fixed reflections representing an area from the body of a camera such as housing, tripod, metal parts, lenses, eyes of the pirate (user of the illegal camera), movements of the camera behavior, suspected human behavior since the person trying to illegally film the screen needs to have the camera aimed towards the screen most of the time. A fixed reflection refers to a reflection that is at the same location for a predetermined period of time (3-4 minutes or more, for example), after having accounted for a tolerance for natural movements of a pirate holding the camera, for example, in his seat in the movie theater. If a film lasts for 90 minutes the database will contain a very large number of pictures where the reflections from different zones in the room can be compared. Using a small field of view is disadvantageous since the scanning of an auditorium may take a long time (for example, 20-30 minutes) and the opportunity to effectively analyze the images captured will be very low.

The detector device of the invention can use both visible light and invisible light (either each alone or using both together) in order to minimize annoying the audience. Using both invisible and visible light detectors together can reveal if a pirate is using an IR filter, as when both pictures with visible light and invisible light are compared it can be detected if a pirate is using an IR filter. Sometimes, a pirate might place an IR filter on his camera's lenses, hence the lenses will not be visible when taking a picture in IR light only. When images are taken with both IR and visible light, such user of an IR filter on a pirate camera can be detected in the pictures taken with visible light. If the camera is detected in both wavelengths (IR image and visible light image) then no IR filter is used. However, if the camera is only detected in the visible light image, it can be assumed that an IR filter has been in use. The usage of both wavelengths enables the detector device of the invention to collect reflections from invisible light without annoying the audience and from time to time with visible light. All additional reflections from visible and invisible light enlarge the Blob database thus allowing for higher quality analysis of captured reflections. The device can be operated also by using only visible light in very short pulses of light that will minimize the annoyance of the audience.

Alternatively, a single camera can be used without the need to scan the audience taking partial pictures to be combined to single picture of the audience/room. Such a camera needs to have the ability to capture the entire room (or the entire zone to be monitored in a room) in a single shot with a high enough resolution to capture reflections from any spot in the room or zone to be monitored. The captured images are analyzed to identify blobs representing reflections, the blobs are then stored in the Blob database. The Blob database can then be analyzed for stable reflections representing an area from the body of a camera such as: housing, tripod, metal parts, lenses, eyes of the pirate, movements of the piracy camera behavior, suspected human behavior since the person trying to illegally film the screen needs to have the camera aimed towards the screen most of the time.

In some embodiments, for example, in a movie theater, the light source uses visible light. Preferably, the visible light (flash) should only be used when it is not very disturbing to the audience, such as when at least one of the following conditions is met: the illuminance of the movie screen is at least 10 lux, that is the movie scene played on the screen is relatively bright and thus the flash coming to the audience from the direction of the screen is not very disturbing; the value of the illuminance of the movie screen is at least 10% of the value of the light source; or the audible sound of the movie played is at least 50 decibels, that is there is a noisy scene and thus the flash is not very disturbing to the audience.

In some embodiments, after an illegal camera is detected a message is spoken and/or overlaid on a screen in the room urging the user of the illegal camera to stop filming with the illegal camera.

Such message comprises information about the location of said illegal camera in the room, for example, "warning to user in row X, stop filming the movie immediately or security will be called", "warning to user in row X, Y or Z (center of movie theater, right side, left side etc.), stop filming the movie immediately or security will be called", etc.

In some embodiments, the message comprises a picture of the area of said illegal camera in the room or a close-up picture of the person using the illegal camera. The picture can show the general area of the suspected illegal camera or even actually show the face of the user (or users) sitting by the suspected illegal camera.

Alternatively, a message is spoken instead or together with the overlaid message on the screen.

In another aspect, the present invention relates to a method for detecting the presence of one or more active (filming) video cameras in a room (positioned towards a screen in a movie theater) with an audience by capturing electromagnetic radiation emanating from said one or more video cameras, the method comprising the steps of:

illuminating the room with infrared and/or visible light signal;

having multi length signal illuminated on the audience and the space in front the screen;

having an infrared signal emitted from the audience and any object in the said space;

having multi length signal emitted from the audience and any object in the said space;

optionally passing said infrared signal through an optical filter (with a wavelength similar to wavelength of the infrared signal);

detecting said infrared signal by a detector; and translating the signal received by the detector to a signal representing the estimated number of one or more video cameras positioned towards the screen.

By analyzing the properties of the blob comprising shape, size, intensity and location of the blobs (reflections) from a number of cycles and calculating the minimal changes between reflections in different images, real detections can be discriminated from false alarms. The real detections represent the numbers of active (filming) video cameras positioned towards the screen. The comparison between blobs includes comparison one or more of their properties wherein each property can include predetermined threshold values for allowing for some variance that is still tolerated and considered to represent the same blob.

If someone is holding a mobile phone without intension and the camera side faces the screen, the algorithm of the invention calculates for how long the camera is facing toward the screen, and will not flag it as a pirate candidate if the camera faces the screen for a short period of time only. Since the present invention has the option to scan the audience dozens of times, it can easily separate real piracy usage from an occasional camera facing the screen. If the IR illumination pulse is short enough than the IR filter is not required at all. The filter can be used, for example, for 800 to 900 nm but blocking 870 nm which is the IR emitter for a deaf person.

Reference is now made to FIG. 1 showing an exemplary detection system of the invention comprising:

(1) A light source 10 that can be LED's or lamps or lasers that are constantly illuminating or pulse illumination, in order to illuminates with pulses;

(2) A light source electronics 20;

(3) Light detector 30 such as a camera or an equivalent implementation;

(4) Light detector electronics 40;

(5) A pulse generator circuits 50 that create a pulse or different series of pulses to enlarge the blob database 60. The pulse generator 50 drives the light source 10 in a manner where it is synchronized with the light detector 30;

(6) A timing controller and synchronizer card 70 controls the pulse and camera shutter;

(7) A Blob database 60 for storing the images that are captured for further signal processing and image processing;

(8) A signal processor 80 is used for performing the calculations and analysis; and (9) Optionally, a communication unit 90 (any wired or wireless communication can be used) can be used to communicate piracy candidates to one or more parties that can handle these alerts. The Basic Electronic Circuit and Power Supply 75 is responsible for delivering the current and voltage for the different components of the system.

The definition of "image" as referred to herein should be interpreted in a large sense and also includes a signal received from a single light detector or from an array of light detectors.

The light source 10 can be in ultraviolet spectrum (200-400 nm), in the visible spectrum (400-700 nm (nanometers)) or in the near infrared (NIR) spectrum (respectively 700-3000 nm). This spectrum range, or part of it, is sometimes also referred to as SWIR (Short Wave Infrared).

An optional spectral filter 25 may be installed in front of the light source 10.

The light detector 30 can be a Charge Coupled Device (CCD) camera that is a device with light-sensitive photo cells which is used to create bitmap images. Alternatively other types of camera can also be used such as a Complementary Metal Oxide Semiconductor (CMOS) camera, any other digital camera, an analog camera, a camera including an image intensifier coupled to the camera's matrix (intensified camera). The light detector 30 can also be a single sensor or a line camera, or a single detector or a matrix of several detectors (2×2, 4×4, 10×10, 1000×1000 for example, or with different aspect ratio) or four quarter detectors or position sensitive detector. Naturally, the camera includes adequate optical components, familiar to any person skilled in the art, in order to focus the light beams into the electrooptic sensor.

A distinct advantage of a camera compared to a single sensor is that a camera allows distinguishing between different objects in the field of view (FOV) while with a single dimensional sensor each object in the field of view along the line of sight can contribute to the signal, but may not be distinguishable on its own.

Another example of a light detector 30 is a photodiode or an avalanche photodiode. The light detector 30 is sensitive to the wavelength of the light source. An optional spectral filter 25 may be installed in front of the light detector 30. The system can thus work without any spectral filter 25, with a spectral filter 25 only in front of the light source 10, with a spectral filter 25 only in front of the light detector 30, or with the same spectral filter 25 installed both in front of the light source 10 and in front of the light detector 30.

The light detector 30 can use any optical lens (single or compound) known in the art in order to optimize the light detection process.

The light source 10 can operate in a continuous manner or only emit periodically in pulses. Depending on the light source 10, it can be operated either continuously, in pulses or both. A continuous light source 10 can be made to emit in pulses by using a chopper. A more flexible method is to operate a LED via a wave generator, a signal generator or a specific electronic integrated circuit and thus control the pulses in a flexible and random way. A chopper for example, can be used to create pulses with a constant duty cycle and a constant time cycle. Changing the speed of the wheel can change the time cycle and width of the pulse, but it cannot change each individual pulse. Changing the duty cycle requires changing the wheel to a wheel with different opening spaces.

In a light source 10 such as a LED or lasers, the pulses can be controlled by a signal generator to determine as needed the kind of signal required at each moment. This flexibility can thus be used to influence the momentary intensity of the light source 10 to control the amount of light receive by the light detector 30 in one hand, and meet safety regulations on the other hand.

The Blob database 60 stores references for both existing blobs (identified in the room before people enter it) and blobs identified while scanning the room with people inside it. For each blob, different parameters are stored such as, location, shape, size and intensity. The intensity can be measure as the level of gray on a gray scale. For example, if the system uses 256 shades of gray, a given blob can be identified as being the shade of gray number 114.

Figure 2:
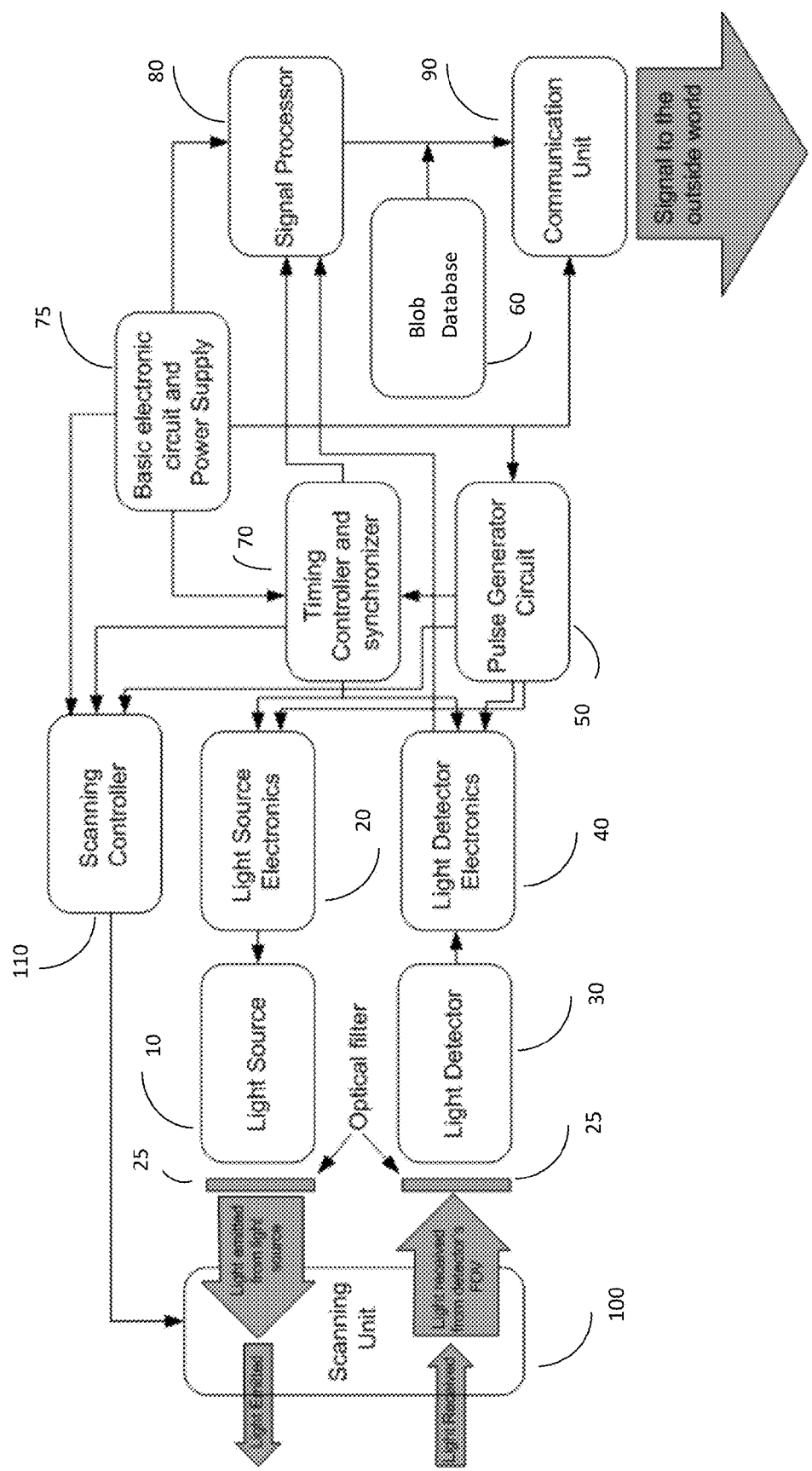
FIG. 2 is a block diagram of light source and light reflected including a scanning module.

Reference is now made to FIG. 2 showing an exemplary system similar to the one in FIG. 1 further comprising a scanning unit 100. The scanning unit 100 is used for taking partial images of the room and combining them to a single image of the room. The scanning unit 100 can use, for example, a stepper motor in order to scan all the cinema room. The scanning unit 100 includes a motor and a mount for holding the illumination unit 10, camera 30, optics and electronic driver. The scanning controller 110 is responsible to control the motor: duration of rotation, accelerations, delays, number of rotations, number of stops, cycle definitions, cycle start and cycle end.

It will be obvious to any person skilled in the art that a plurality of cameras can replace a scanning unit 100 in a manner that each camera will capture a partial image of the room (only of its field of view). The images from all the cameras will then be joined to form a single image of the room.

Alternatively, a single quality camera with a very large field of view, for example, 30-60 degrees can capture an image of the entire audience with appropriate optics.

The scanning unit 100 seems the most cost effective solution compared to using multiple cameras or a single quality camera with a very large field of view.

The optical filter shown in the drawings is optional, depending on the lighting in the cinema hall or the room where the piracy camera should be detected.

Optionally, the method can comprise a further step of communicating the estimated number of cameras to a remote facility. The remote facility can further process the received data, and can also decide on the appropriate action to take based on the information received.

The term "audience" as referred to herein should be interpreted in a broad sense to encompass, a viewing public, a participating public, passive public, chairs and any object in an auditorium or theater that is located in front of the screen and the pictures on that screen can be visible from that area.

In yet another aspect, the present invention also relates to an overlay system in a movie theater adapted for receiving a signal from a camera detector that an illegal camera has been detected in the movie theater and overlaying a text warning message on the movie screen of said movie theater. The camera detector used can be any kind of camera detector, and can include multiple camera detectors in the same movie theater (identical or of different types).

The text overlay over the movie screen can be achieved by connecting to the movie projector and sending instructions to the movie projector regarding the text to be displayed, the location of the screen where the text is to be displayed and the duration that the overlay text should remain visible on the movie screen. Alternatively, an independent projector (secondary projector) can be used to overlay the text warning message over the movie screen.

In some embodiments, the message comprises information about the location of said illegal camera in the room. The location information can be more general (front, back, right side, left side, center, mezzanine etc.) or can be more precise (row X, row X seat Y etc.).

In some embodiments, the message comprises a picture of the area of said illegal camera in the room or a close-up picture of the person using the illegal camera.

In some embodiments, the text message is accompanied by an audio message.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A camera detector device for detecting the presence of an illegal camera inside a room, the device comprising:
    a light source for illuminating a room, wherein the light source uses visible light and the light source is operated in a movie theater when at least one of the following conditions is met:
    the illuminance of the movie screen is at least 10 lux;
    the value of the illuminance of the movie screen is at least 10% of the value of the light source; or
    the audible sound of the movie played is at least 50 decibels;
    a light detector for capturing multiple images of said room;
    a blob database for storing blobs representing reflections identified in said captured images, each blob being identified via one or more properties; and
    a processor for analyzing said multiple images of the room taken over a period of time in order to identify blobs representing reflections in said images, and signaling a blob as an illegal camera if said blob appears in said multiple images over a predetermined amount of time with similar blob properties within predefined threshold values for each blob property.

2. The camera detector device according to claim 1, further comprising a scanning unit, such that each time only a partial image of the room is captured and the partial images are combined to form a single image of the room.

3. The camera detector device according to claim 1, wherein said blob properties comprise location, size, intensity, shape or any combination thereof.

4. The camera detector device according to claim 1, wherein the reflections captured are compared during every minute or less.

5. The camera detector device according to claim 1, wherein the processor first analyzes the reflections in the room without the audience and then cancels these reflections as permanent reflections of the room from images captured with the audience.

6. The camera detector device according to claim 1, wherein detection operation commences only when an audience is detected in the room.

7. The camera detector device according to claim 6, wherein the audience is detected via a volume detector, a sound detector, input from a person, a signal from the film projection unit or any combination thereof.

8. The camera detector device according to claim 1, wherein said camera detector is placed in a movie theater and said illegal camera is an illegal camera filming a movie played on a screen in said movie theater.

9. The camera detector device according to claim 1, wherein after an illegal camera is detected a message is spoken and/or overlaid on a screen in said room urging the user of said illegal camera to stop filming with said illegal camera.

10. The camera detector device according to claim 9, wherein said message comprises information about the location of said illegal camera in the room.

11. The camera detector device according to claim 9, wherein said message comprises a picture of the area of said illegal camera in the room or a close-up picture of the person using the illegal camera.

12. An overlay system in a movie theater adapted for receiving a signal from a camera detector according to claim 1, that an illegal camera has been detected in the movie theater and overlaying a text warning message on the movie screen of said movie theater.

13. The overlay system according to claim 12, wherein said message comprises information about the location of said illegal camera in the room.

14. The overlay system according to claim 13, wherein said message comprises a picture of the area of said illegal camera in the room or a close-up picture of the person using the illegal camera.

15. The overlay system according to claim 12, wherein the text message is accompanied by an audio message.

\* \* \* \* \*